June 9, 1942.    G. A. TINNERMAN    2,286,042
FASTENING DEVICE
Original Filed Jan. 7, 1937
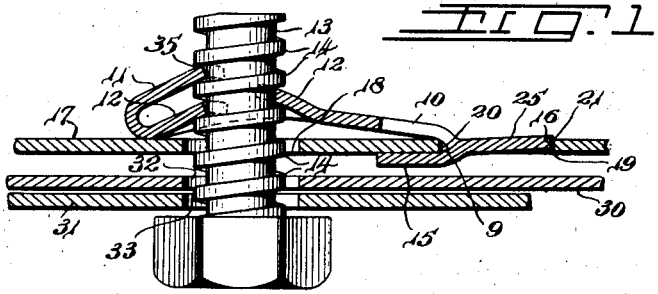
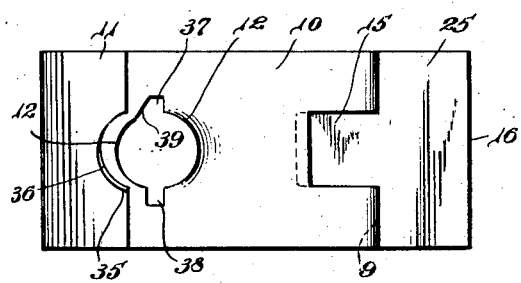
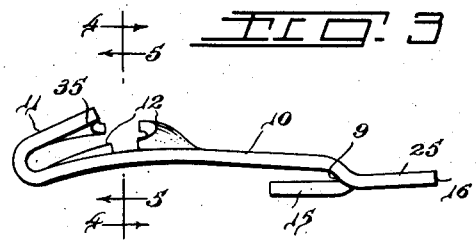
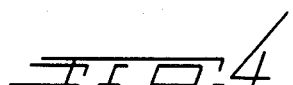
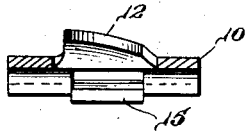
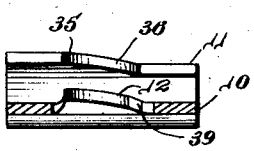
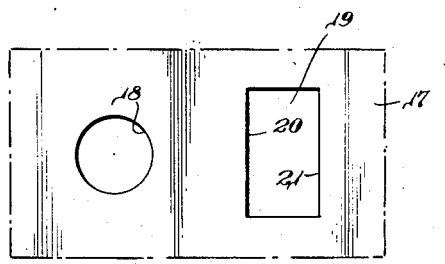
Inventor
GEORGE A. TINNERMAN
By H. G. Lombard
Attorney Patented June 9, 1942

2,286,042

UNITED STATES PATENT OFFICE 2,286,042

FASTENING DEVICE

George A. Tinnerman, Cleveland, Ohio, assignor, by mesne assignments, to Tinnerman Products, Inc., Cleveland, Ohio, a corporation of Ohio Original application January 7, 1937, Serial No. 119,415, now Patent No. 2,222,449, dated November 19, 1940. Divided and this application October 16, 1940, Serial No. 361,451

12 Claims. (Cl. 85—36)

This invention relates to threadless fasteners, and particularly those known as sheet metal nuts which are adapted to be used in an assembly wherein it is necessary for the fastener to retain itself in bolt receiving position prior to the insertion of the bolt. The present application is a division of copending application Serial Number 119,415, filed January 7, 1937, and since issued as U. S. Patent Number 2,222,449 November 19, 1940.

Previous forms of devices of this nature have been provided by what are referred to in the trade as clinch-on nuts or nut holding devices embodying conventional threaded nuts and cage devices which are riveted, spot welded or otherwise attached to a part to be secured preparatory to the operation by which such part is fastened in the fabrication of a structure, and particularly, in a blind location wherein it is impossible or inconvenient for an operator to hold the nut while applying the securing bolt or screw thereto.

However, any such arrangement comprising only a threaded nut is often unsatisfactory and inefficient over a period of use, because, generally, no means are provided to prevent loosening and unscrewing of the threaded fastener. Furthermore, though any such fastening arrangement may be employed somewhat satisfactorily in certain installations in which cost is of no great consequence, the use thereof is prohibitive in such constructions as require a simple, light weight and inexpensive fastening means which may be easily and quickly applied to provide a locked fastening installation in a minimum of time and effort and relatively few assembling operations.

A most inexpensive and practical arrangement for securing various structural parts involves the use of one-piece sheet metal nuts comprising tempered, spring metal locking plates provided with integral bolt thread engaging means designed for threadedly engaging a threaded fastening member in the manner of an ordinary nut. The spring metal material of such locking plates is, of course, considerably harder, tougher and of much greater tensile and compressive strength than that of a sheet metal supporting structure, for example, and accordingly, the bolt thread engaging elements thereof are admirably suited for providing not only a stronger, superior connection between the part secured and the supporting structure than would be possible otherwise, but also a tightened, practically self-locking, fastening engagement of the securing bolt in final applied position rigidly securing the respective parts of an installation. Thus, there is eliminated the necessity for lock washers, and the like, with the resultant savings in the cost of such devices and the expense of labor in the tedious, time-consuming assembling operations which such fastenings require.

In the use of such self-locking sheet metal nuts, various forms of threaded fasteners embodying the well known V-shaped thread are employed with excellent results in the average installation comprising light and medium weight parts. However, in heavy duty installations in which relatively heavy parts are secured and subject to pronounced vibration and jarring effects, as in the mounting of an automobile fender, for example, it has been found that the necessary greater factor of safety may best be obtained at the least possible added cost by the use of a threaded fastener having a square thread.

This takes place by reason of the fact that in the tightening action of a fastener having a square thread, all the force is put parallel to the axis of the bolt or screw. In addition, when employed with a sheet metal nut in accordance with the present invention, such a square thread defines relatively wide thread surfaces which extend generally normal to the axis of the bolt or screw and are thereby adapted to provide a most effective thread engaging action of great strength with the complementary thread portion of the sheet metal nut. In this respect, the elements of the thread portion of the sheet metal nut, as provided for use with a bolt having a square thread, are capable of engaging substantially the full amount of such square thread surface and on lines generally at right angles to the axis of the bolt or screw. And this, together with the usually total force of tightening taking place parallel to the axis of a bolt or screw having a square thread, provides for a stronger, superior fastening installation by a sheet metal nut than is possible otherwise using the ordinary threaded fastener having a V-shaped thread.

An object of the present invention, therefore, is for the provision of a sheet metal nut or nut structure having a thread engaging portion or means which is especially adapted for use with a threaded fastener having a square thread in a manner to provide a relatively stronger, superior connection for heavy duty installations, as and for the purposes described.

Another object of the invention is to provide a new and improved combination of fastening members comprising a bolt or screw having a square thread and a sheet metal nut or nut structure constructed and arranged with a thread portion comprising thread engaging elements capable of self locking threaded engagement with such a square screw threaded fastener and under increased tightening force and inherently greater holding power than heretofore known forms of sheet metal nut devices.

Further objects and advantages and other new and useful features in the construction, arrangement and general combination of parts of the invention will be apparent to those skilled in the art as a description thereof proceeds with reference to the accompanying drawing, for purposes of illustration but not of limitation, in which like reference characters designate like parts throughout, and in which:

Fig. 1 is a vertical section showing the securing of a plurality of parts by the improved fastening means of the present invention;

Fig. 2 is a top plan view of the sheet metal nut per se illustrated in Fig. 1;

Fig. 3 is a side view or edge elevation of the fastener shown in Fig. 2;

Fig. 4 is a sectional view taken on line 4—4 of Fig. 3, looking to the right;

Fig. 5 is a sectional view taken on line 5—5 of Fig. 3, looking to the left; and Fig. 6 is a top plan of an article or part showing the layout of openings therein for attaching the sheet metal nut and for receiving a threaded fastener with which the same is to be used.

The sheet metal nut fastener which is illustrated in the drawing has a body portion 10, one end of which is bent upwardly and backwardly upon itself, as at 11, and which cooperates with bent portions 12 adjacent a bolt opening in said body 10 to provide bolt-receiving means for threadedly engaging a multiple turn on the shank of a threaded member 13. To attach or hold the fastener in bolt-receiving position upon a part to be joined, there is provided substantial clip means at the end opposite the turned-up portion 11, the same being preferably formed from the material which comprises the body 10 of the fastener. In the form illustrated, the clip means embodies a tongue 15 which is struck downwardly from the fastener body 10 at a point spaced inwardly from the end 16 thereof, and sufficiently far to engage the underside of one of the parts to be joined.

The engagement between the top and bottom sides of a part to be joined is illustrated in Fig. 1 wherein 17 represents a plate having a bolt passage 18 and a fastener attaching aperture 19 therein. The tongue 15 is spaced sufficiently far from the body of the fastener, that when the edge 20 of the aperture 19 engages the crotch or shoulder 9 between the tongue 15 and the fastener body, the opening defining the bolt thread engaging portion 12 of the fastener will be in registration with the bolt passage 18 in said part 17.

To attach the fastener, the aperture 19 in the part 17 has one dimension which is substantially the same as the width of the fastener body 10 and with just enough clearance to admit the fastener readily, while the transverse dimension is sufficient to permit endwise movement of the fastener through the aperture during the assembling operation. When the crotch 9 of the fastener is in engagement with the edge 20, however, part of the opening 19 would normally remain unsealed, and whenever the fastener is used for assembling the fender on an automobile body, the unsealed part would permit the entrance of water, exhaust vapors, dirt and foreign matter into the vehicle body. To conceal such opening, therefore, there is provided on the fastener body, an extension 25 which fits snugly within the opening 19 after the fastener has been inserted into place. By utilizing a close-fit between the extension 25 and the walls of the aperture 19, the end 16, of the extension can be snapped into abutting engagement with the wall 21 of said aperture 19 as the final act in the assembling operation. Thereupon, the fastener is securely held in bolt-receiving position, and at the same time the aperture through which the fastener is attached is adequately sealed.

To attach a fastener made in accordance with the invention, the end of the bolt thread engaging portions thereon may be inserted through the aperture 19 from the side shown as the bottom in Fig. 6 until the part 17 adjacent the wall 20, enters the space between the fastener body 10 and the tongue 15, whereupon the fastener is pushed forwardly until the end 16 of the extension snaps into abutting engagement with the wall 21. Thereafter, the part 30 and the washer 31, having openings 32 and 33 therein in registration with the bolt passage 18, may be brought into position with respect to the part 17 and the bolt 13 may be inserted through the aligned openings. At such time, the portions 12 engage one convolution of the bolt thread 14 and the thread engaging portion 35 on the upturned part 11 engages another turn of the bolt thread. The thread engaging portion 35 is preferably made in the shape of the helix on the marginal edge of a notch 36 that is provided at the end of the upturned tongue or arm 11. Thus, when the bolt is tightened all of the parts are brought into cooperating relationship.

The bolt 13, in the present embodiment directed to heavy duty installations, has a square thread 14 and, for best results, the sheet metal nut fastener 10 is made of stock of a gauge or thickness approximating or slightly less than the pitch or space between adjacent convolutions of such square thread. Preferably, the bolt opening in the fastener body 10 between the bent portions 12, is of a predetermined size for receiving snugly the root diameter of said bolt 13 in the normal or initial generally bowed or concave configuration of said fastener body as shown in Fig. 1.

Said bolt opening preferably includes opposed lateral slots 37, 38, for admitting the square thread 14 upon turning movement of said bolt into fastening relation therewith such that the generally round marginal edge portions of said bolt opening between said slots 37, 38, define cooperating thread engaging elements 12 in the form of distinct tongues, or the like, designed for threaded abutting engagement with substantially the entire thread surface of said square thread of the bolt.

The thread engaging elements 12 thus provided are each preferably integral with the body 10 except adjacent the lateral slots 37, 38, thereby providing for the maximum possible strength therein while said slots otherwise permit said thread engaging elements 12 to be bent outwardly out of the plane of the body 10 to define distinct cooperating substantial tongues having their extremities on a helix, Figs. 4, 5, corresponding substantially to that of the square thread 14 for uniform threaded engagement with any thread convolution of the bolt in cooperation with thread engaging element 35 engaging an adjacent thread convolution thereof.

To facilitate the initial engagement of the bolt thread with such thread engaging means, the slot 37 at the lowest point of the helix defined by the bent portions 12, is preferably formed with an angular side edge 39 providing an enlarged recess adapted to receive freely the leading end of the square thread 14 by a quick turning movement of the bolt 13 in a minimum of time and effort. Upon continued rotation of the bolt, the square thread then easily rides up on the remainder of the helix defined by bent portions 12 and the thread engaging element 35, to advance the screw axially to fully tightened fastening position securing the parts of the installation.

In this relation, the generally round marginal edges or tongue extremities defined by the thread engaging elements 12 and element 35 on arm 11 are designed to snugly receive the root diameter of the bolt 13 with material portions adjacent said marginal edges in positive abutting engagement with the relatively wide, square thread surfaces 14 of said bolt.

It will be thus appreciated that in the final tightening action of the bolt 13, said thread engaging elements 12 and 35 are capable of extraordinary holding power by reason of such positive abutting engagement with the square thread surfaces of the bolt. At the same time the body 10 is somewhat flattened from its initial generally concave configuration such that the extremities of said thread engaging elements 12 are caused to move into firm, frictional, gripping and biting relation both with the root diameter of the bolt and the square thread surfaces thereof in providing automatically a thread locking action on the bolt by which the same is not subject to loosening or displacement from fully tightened, applied fastening position, even under extreme condition of shock, jarring effects and vibratory motion in an installation.

While the invention has been described in detail with a specific example, such example is intended as an illustration only, since it will be apparent to those skilled in the art that other modifications in the construction, arrangement and general combination of parts thereof may be devised without departing from the spirit and scope of the invention. The present embodiment is therefore to be considered in all respects as illustrative and not restrictive, the scope of the invention being indicated by the appended claims rather than by the foregoing description, with all changes falling within the scope, meaning and range of equivalency of the claims intended to be embraced therein.

What is claimed is:

1. A sheet metal nut structure provided with an integral thread portion for threadedly engaging a threaded member, having a square thread, comprising, a sheet metal body of a gauge approximating the pitch of said square thread and provided with an opening for receiving said threaded member, said opening including lateral slots for admitting said square thread and defining cooperating thread engaging elements on portions substantially in the general plane of said body, at least one of said thread engaging elements being integral with said body in the area bordering one of the slots of said opening, said thread engaging elements being bent outwardly out of the plane of the body such that the edges thereof adjacent said opening lie on a helix corresponding substantially to that of said square thread for abutting engagement with a convolution of said thread.

2. A sheet metal nut structure provided with an integral thread portion for threadedly engaging a threaded member having a square thread, comprising, a sheet metal body of a gauge approximating the pitch of said square thread and provided with an opening for receiving said threaded member, said opening including lateral slots for admitting said square thread and defining cooperating thread engaging elements on portions substantially in the general plane of said body and which are integral with said body in the areas bordering said slots, said thread engaging elements being bent outwardly out of the plane of the body such that the edges thereof adjacent said opening lie on a helix corresponding substantially to that of said square thread for abutting engagement with a convolution of said thread.

3. A sheet metal nut structure provided with an integral thread portion for threadedly engaging a threaded member having a square thread, comprising, a sheet metal body of a gauge approximating the pitch of said square thread and provided with a generally round opening corresponding substantially to the root diameter of said threaded member, said opening including lateral slots for admitting said square thread and defining cooperating thread engaging elements on portions substantially in the general plane of said body and provided with generally round extremities for snugly receiving the root of said threaded member, at least one of said thread engaging elements being integral with the body in the area bordering one of the slots of said opening, said thread engaging elements being bent outwardly out of the plane of the body such that the edges thereof adjacent said opening lie on a helix corresponding substantially to that of said square thread for uniform abutting engagement with a convolution of said thread.

4. A sheet metal nut structure provided with an integral thread portion for threadedly engaging a threaded member having a square thread, comprising, a sheet metal body of a gauge approximating the pitch of said square thread and provided with a generally round opening corresponding substantially to the root diameter of said threaded member, said opening including lateral slots for admitting said square thread and defining cooperating thread engaging elements on portions substantially in the general plane of said body and provided with generally round extremities for snugly receiving the root of said threaded member, said thread engaging elements being integral with the body in the areas bordering said slots and being bent outwardly out of the plane of the body such that the edges thereof adjacent said opening lie on a helix corresponding substantially to that of said square thread for uniform abutting engagement with a convolution of said thread.

5. A sheet metal nut structure provided with an integral thread portion for threadedly engaging a threaded member having a square thread, comprising, a sheet metal body of a gauge approximating the pitch of said square thread and formed in a generally concave configuration together with an opening corresponding substantially to the root diameter of said threaded member, said opening including lateral slots for admitting said square thread and defining cooperating thread engaging elements on portions substantially in the general plane of said body, at least one of said thread engaging elements being integral with said body in the area bordering one of the slots of said opening, said thread engaging elements being bent outwardly out of the plane of the body such that the extremities thereof are adapted to snugly receive the root of said threaded member and lie on a helix corresponding substantially to that of said square thread for abutting engagement with a convolution of said thread, said generally concave body being adapted to be flattened from its initial configuration upon tightening of the threaded member to cause said extremities of the cooperating thread engaging elements to move into locking engagement with said threaded member.

6. A sheet metal nut structure provided with an integral thread portion for threadedly engaging a threaded member having a square thread, comprising, a sheet metal body of a gauge approximating the pitch of said square thread and formed in a generally concave configuration together with an opening corresponding substantially to the root diameter of said threaded member, said opening including lateral slots for admitting said square thread and defining cooperating substantial tongue elements or the like on portions substantially in the general plane of said body, said tongue elements being integral with said body in the areas bordering said slots and being bent outwardly out of the plane of the body such that the extremities thereof lie on a helix corresponding substantially to that of said square thread for uniform abutting engagement with a convolution of said thread, said generally concave body being adapted to be flattened from its initial configuration upon tightening of the threaded member to cause said tongue extremities to move inwardly into locking engagement with said threaded member.

7. A sheet metal nut structure provided with an integral thread portion for threadedly engaging a threaded member having a square thread, comprising, a sheet metal body of a gauge approximating the pitch of said square thread and provided with an opening for receiving said threaded member, said opening including lateral slots for admitting said square thread and defining cooperating thread engaging elements on portions substantially in the general plane of said body, at least one of said thread engaging elements being integral with said body in the area bordering one of the slots of said opening, said thread engaging elements being bent outwardly out of the plane of the body such that the edges thereof adjacent said opening lie on a helix corresponding substantially to that of said square thread for abutting engagement with a convolution of said thread, and another thread engaging element in said sheet metal nut structure for engaging a convolution of said square thread other than that engaged by said cooperating thread engaging elements.

8. A sheet metal nut structure provided with an integral thread portion for threadedly engaging a threaded member having a square thread, comprising, a sheet metal body of a gauge approximating the pitch of said square thread and provided with an opening for receiving said threaded member, said opening including lateral slots for admitting said square thread and defining cooperating thread engaging elements on portions substantially in the general plane of said body and which are integral with said body in the areas bordering said slots, said thread engaging elements being bent outwardly out of the plane of the body such that the edges thereof adjacent said opening lie on a helix corresponding substantially to that of said square thread for abutting engagement with a convolution of said thread, and another thread engaging element in said sheet metal nut structure for engaging a convolution of said square thread other than that engaged by said cooperating thread engaging elements.

9. A sheet metal nut structure provided with an integral thread portion for threadedly engaging a threaded member having a square thread, comprising, a sheet metal body of a gauge approximating the pitch of said square thread and provided with a generally round opening corresponding substantially to the root diameter of said threaded member, said opening including lateral slots for admitting said square thread and defining cooperating thread engaging elements on portions substantially in the general plane of said body and provided with generally round extremities for snugly receiving the root of said threaded member, at least one of said thread engaging elements being integral with the body in the area bordering one of said slots of the opening, said thread engaging elements being bent outwardly out of the plane of the body such that the edges thereof adjacent said opening lie on a helix corresponding substantially to that of said square thread for uniform abutting engagement with a convolution of said thread, and another thread engaging element in said sheet metal nut structure for engaging a convolution of said square thread other than that engaged by said cooperating thread engaging elements.

10. A sheet metal nut structure provided with an integral thread portion for threadedly engaging a threaded member having a square thread, comprising, a sheet metal body of a gauge approximating the pitch of said square thread and provided with a generally round opening corresponding substantially to the root diameter of said threaded member, said opening including lateral slots for admitting said square thread and defining cooperating thread engaging elements on portions substantially in the general plane of said body and provided with generally round extremities for snugly receiving the root of said threaded member, said thread engaging elements being integral with the body in the areas bordering said slots and being bent outwardly out of the plane of the body such that the edges thereof adjacent said opening lie on a helix corresponding substantially to that of said square thread for uniform abutting engagement with a convolution of said thread, and another thread engaging element in said sheet metal nut structure for engaging a convolution of said square thread other than that engaged by said cooperating thread engaging elements.

11. A sheet metal nut structure provided with an integral thread portion for threadedly engaging a threaded member having a square thread, comprising, a sheet metal body of a gauge approximating the pitch of said square thread and formed in a generally concave configuration together with an opening corresponding substantially to the root diameter of said threaded member, said opening including lateral slots for admitting said square thread and defining cooperating thread engaging elements on portions substantially in the general plane of said body, said thread engaging elements being integral with said body in the areas bordering said slots and being bent outwardly out of the plane of the body such that the extremities thereof are adapted to snugly receive the root diameter of said threaded member and lie on a helix corresponding substantially to that of said square thread for abutting engagement with a convolution of said thread, said generally concave body adapted to be flattened from its initial configuration upon tightening of the threaded member to cause said extremities of the cooperating thread engaging elements to move into locking engagement with said threaded member, and another thread engaging element in said sheet metal nut structure for engaging a convolution of said square thread other than that engaged by said cooperating thread engaging elements.

12. A sheet metal nut structure provided with an integral thread portion for threadedly engaging a threaded member having a square thread, comprising, a sheet metal body of a gauge approximating the pitch of said square thread and formed in a generally concave configuration together with a generally round opening corresponding substantially to the root diameter of said threaded member, said opening including lateral slots for admitting said square thread and defining cooperating substantial tongue elements or the like on portions substantially in the general plane of said body and having generally round extremities for snugly receiving the root of said threaded member, said tongue elements being integral with said body in the areas bordering said slots and being bent outwardly out of the plane of the body such that the extremities thereof lie on a helix corresponding substantially to that of said square thread for uniform abutting engagement with a convolution of said thread, said generally concave body being adapted to be flattened from its initial configuration upon tightening of the threaded member to cause said tongue extremities to move inwardly into locking engagement with said threaded member, and another tongue element in said sheet metal nut structure for engaging a convolution of said square thread other than that engaged by said cooperating tongue elements.

GEORGE A. TINNERMAN.